(12) United States Patent
Liu et al.

(10) Patent No.: US 11,394,918 B2
(45) Date of Patent: Jul. 19, 2022

(54) SOLID-STATE OPTICAL PHASED SCANNING COMPONENT

(71) Applicant: NATIONAL CHUNG HSING UNIVERSITY, Taichung (TW)

(72) Inventors: Chun-Nien Liu, Pingtung County (TW); Tien-Tsorng Shih, Kaohsiung (TW)

(73) Assignee: NATIONAL CHUNG HSING UNIVERSITY, Taichung (TW)

( * ) Notice: Subject to any disclaimer, the term of this patent is extended or adjusted under 35 U.S.C. 154(b) by 33 days.

(21) Appl. No.: 17/007,941

(22) Filed: Aug. 31, 2020

(65) Prior Publication Data

US 2022/0070406 A1    Mar. 3, 2022

(51) Int. Cl.
*H04N 5/74* (2006.01)
*H04N 3/14* (2006.01)

(52) U.S. Cl.
CPC ......... *H04N 5/7425* (2013.01); *H04N 3/1512* (2013.01); *H04N 3/1562* (2013.01)

(58) Field of Classification Search
CPC .. H04N 5/7425; H04N 3/1512; H04N 3/1562; H01L 33/06
See application file for complete search history.

(56) References Cited

U.S. PATENT DOCUMENTS

| | | | | |
|---|---|---|---|---|
| 11,182,024 | B2* | 11/2021 | Sun | G06F 3/04164 |
| 2013/0070343 | A1* | 3/2013 | Engelhardt | B29D 11/00298 |
| | | | | 359/619 |
| 2018/0164606 | A1* | 6/2018 | Jung | G02B 7/285 |
| 2019/0235340 | A1* | 8/2019 | Kalaev | G02F 1/163 |
| 2020/0363679 | A1* | 11/2020 | Shibazaki | H04N 9/317 |
| 2021/0208253 | A1* | 7/2021 | Takashima | G01S 7/4817 |

* cited by examiner

*Primary Examiner* — Michael E Teitelbaum
(74) *Attorney, Agent, or Firm* — Muncy, Geissler, Olds & Lowe, P.C.

(57) ABSTRACT

A solid-state optical phase scanning array component is provided, including: a plurality of optical units, each of the optical units including a high dielectric constant layer, and a first electrode and a second electrode located on two sides of the high dielectric constant layer, the refractive index of each high dielectric constant layer being changeable as the power supply condition supplied to first and second electrodes is changed; and a lens unit, being disposed to face toward a light-exiting side of the plurality of optical units, and including a light-incident face and a light-exiting face, being configured to guide light beam incident from the light incident surface to the plurality of optical units to change the path of the light beam, and then the light beam emitting out from the light exiting surface.

9 Claims, 4 Drawing Sheets

SOLID-STATE OPTICAL PHASED SCANNING COMPONENT

BACKGROUND OF THE INVENTION

Field of the Invention

The present invention relates to a solid-state optical phased scanning component, for light detection and ranging (lidar) system, holographic scanning and structured light scanning.

Description of the Prior Art

Lidar is a light detection and ranging sensor, which is used to measure the distance of the target object to be detected according to the total travelling time of the scanning light beam from the lidar to the target object to be detected and from the target object to be detected to the lidar. Lidar is of high reliability, long service life, small size, light weight, low cost, etc.

The conventional lidar is generally designed to include a plurality of point light sources arranged in a matrix, in which the light beam angle of each point light source is adjusted by a mechanical moving component. The mechanical moving component is of a complicated structure, a difficult manufacturing process, a high cost. However, insufficient accuracy and/or precision of movement of each mechanical moving component can be caused due to errors in manufacturing or/and controlling respective mechanical moving components.

The present invention is, therefore, arisen to obviate or at least mitigate the above-mentioned disadvantages.

SUMMARY OF THE INVENTION

The main object of the present invention is to provide a solid-state optical phased scanning component which can control phase differences between and travelling directions of light waves of light beam, for scanning.

To achieve the above and other objects, the present invention provides a solid-state optical phased scanning component, including: a plurality of optical units, each of the plurality of optical units including a high dielectric constant layer, and a first electrode and a second electrode located on two sides of the high dielectric constant layer, the refractive index of each said high dielectric constant layer being changeable as the power supply condition supplied to first and second electrodes is changed; and a lens unit, being disposed to face toward a light-exiting side of the plurality of optical units, and including a light-incident face and a light-exiting face, being configured to guide light beam incident from the light incident surface to the plurality of optical units to change the path of the light beam, and then the light beam emitting out from the light exiting surface.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
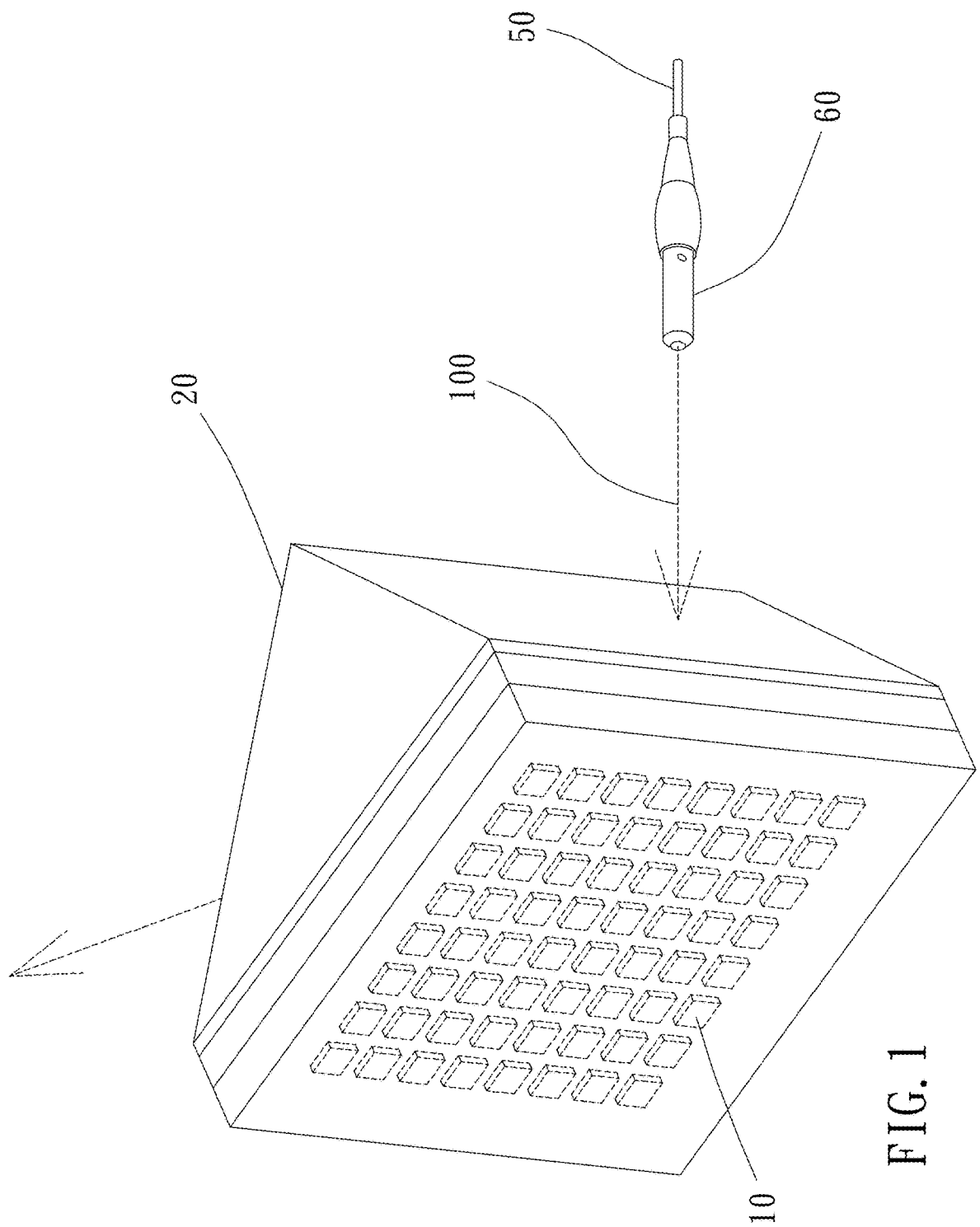
FIG. 1 is a drawing showing a scanning system with a solid-state optical phased scanning component according to a preferable embodiment of the present invention.
Figure 2:
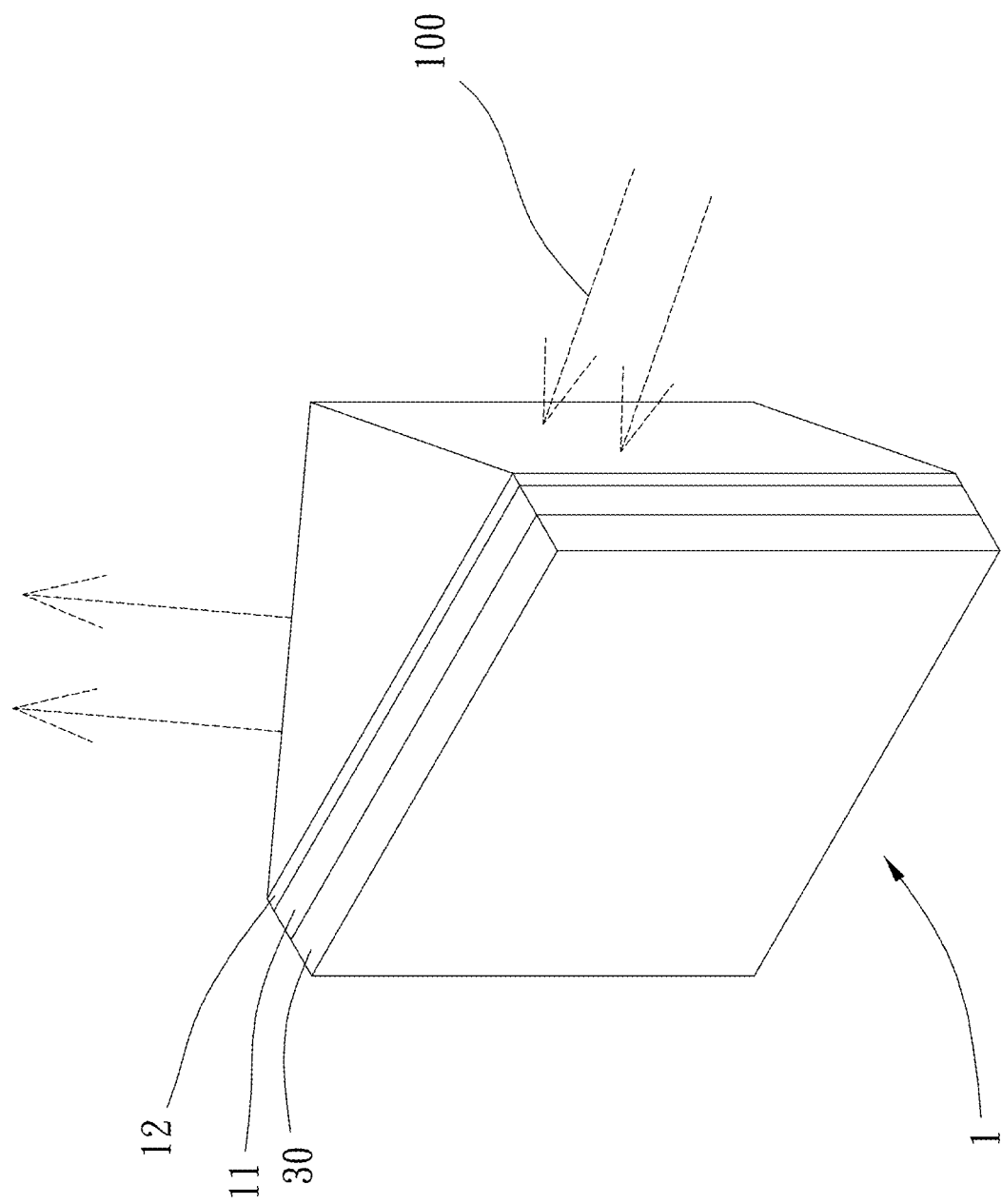
FIG. 2 is a stereogram of the solid-state optical phased scanning component according to a preferable embodiment of the present invention.
Figure 3:
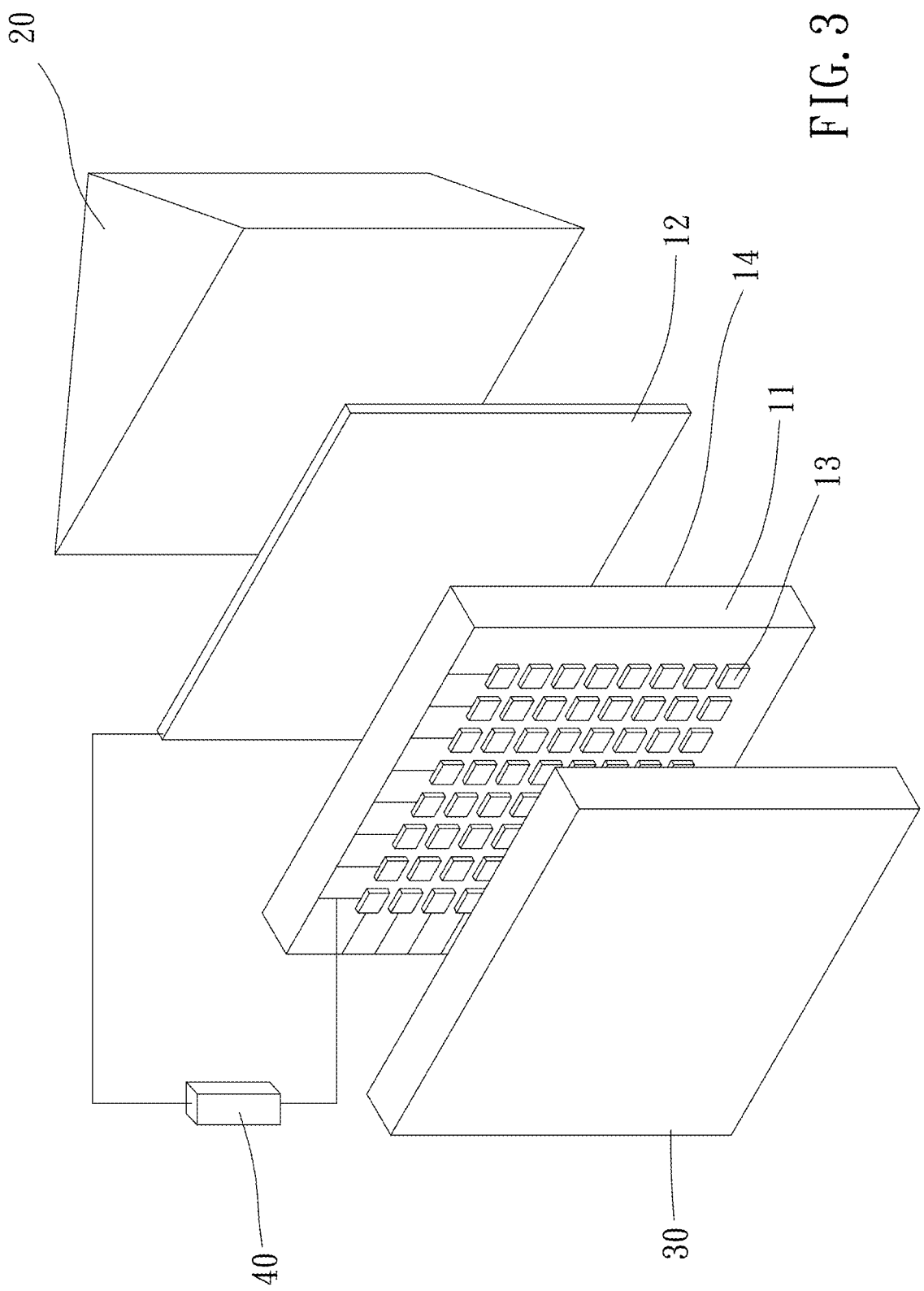
FIG. 3 is a breakdown drawing of the solid-state optical phased scanning component according to a preferable embodiment of the present invention.
Figure 4:
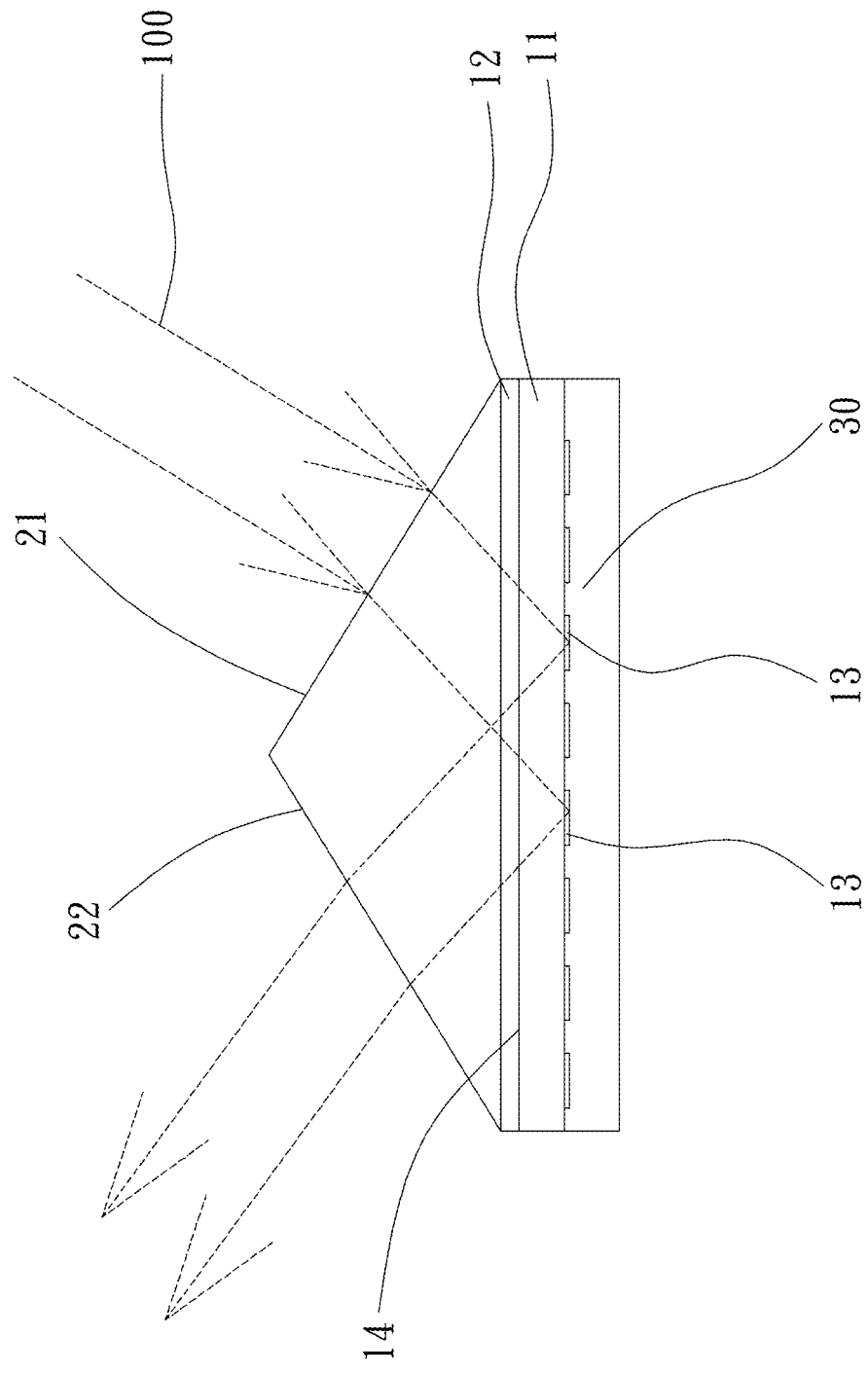
FIG. 4 is a drawing showing action of the solid-state optical phased scanning component according to a preferable embodiment of the present invention.

Please refer to FIGS. 1 to 4 for a preferable embodiment of the present invention. A solid-state optical phased scanning component 1 of the present invention includes a plurality of optical units 10 and a lens unit 20.

Each of the plurality of optical units 10 includes a high dielectric constant layer 11, and a first electrode 12 and a second electrode 13 located on two sides of the high dielectric constant layer 11. The refractive index of each said high dielectric constant layer 11 is changeable as the power supply condition supplied to the first and second electrodes 12, 13 is changed. The power supply condition may be voltage, or any supply condition which is capable of resulting in changing the refractive index of the high dielectric constant layer 11. Each of the plurality of optical units 10 may be reflective or transmissive type. The lens unit 20 is disposed to face toward a light-exiting side 14 of the plurality of optical units 10. The lens unit 20 includes a light-incident face 21 and a light-exiting face 22, the lens unit 20 is configured to guide light beam 100 incident from the light-incident face 21 to the plurality of optical units 10 to change the path of the light beam 100, and then the light beam emitting 100 out from the light-exiting face 22. The light beam 100 may be infrared light beam or light beam with any wavelength. The high dielectric constant layers 11 of the plurality of optical units 10 may be configured in a manner that the refractive indexes of the plurality of optical units 10 are controlled to change individually, groupedly or simultaneously. Whereby, it can control and change the refractive index of the high dielectric constant layer 11 easily by changing the power supply condition of a single light source so as to produce phase difference between light waves of the light beam for scanning. Moreover, Intervals between the plurality of optical units 10 can also cause phase difference between light waves of the light beam. Therefore, it can be up to double adjustment effect of phase difference.

The plurality of optical units 10 are preferably arranged in a matrixed arrangement; or arranged in another arrangement according to any of various requirements. The high dielectric constant layer 11 is, preferably, a titanium carbide layer, silicon nitride layer, aluminum nitride layer, barium titanate layer, silicon dioxide ($SiO_2$) layer, or piezoelectric ceramic layer. Each said high dielectric constant layer 11 may be a part of a one-piece high dielectric constant film. In the process of the high dielectric constant layer 11, single crystal silicon material can be used, which has a small structure, large thermo-optic coefficient, and easy phase adjustment; while using silicon nitride material, its loss is small, processing error tolerance is large, and it is beneficial to accurate control of phase of light wave. The first electrode 12 is located between the lens unit 20 and the high dielectric constant layer 11 and is grounded. The first electrode 12 a light-permeable silver film, copper film, gold film or any suitable conductive film, wherein the thickness of the first electrode 12 is preferably less than or equal to 100 nanometers (nm) so that the first electrode 12 is well light-permeable. Each said first electrode 12 is a part of a metal film, and the metal film is integrally formed of one piece and formed as a single layer. Each of the second electrodes 13 of the plurality of optical units 10 is independently separate from one another and located at a side of the high dielectric constant layer 11 opposite the lens unit 20. The second electrode 13 is light-impermeable and includes a silver film, copper film, gold film or any suitable conductive film which may be additionally disposed on a base film (preferably light-impermeable) and which has a thickness greater than or equal to 10 nm, wherein the total thickness of the second electrode 13 and the base film is preferably less than or equal to 100 nm so that the second electrode 13 is ensured to be light-impermeable. Optionally, the lens unit may be integrally provided directly on a side of the high dielectric constant layer 11 or on a side of the first electrode 12, to be configured in an integral structure, and thus it is unnecessary to mount the lens unit additionally.

In other embodiment, the second electrode 13 may be arranged to face toward the lens unit 20, and the first electrode 12 may be arranged to be located at a side of the high dielectric constant layer 11 opposite the lens unit 20; and the lens unit may be integrally provided directly on a side of the high dielectric constant layer, to be configured in an integral structure, and thus it is unnecessary to mount the lens unit additionally.

In this embodiment, each of the plurality of optical units 10 further includes a back layer 30 which is located on a side of the high dielectric constant layer 11 opposite the lens unit 20. The back layer 30 is preferably a sapphire layer which is good in heat dissipation, supporting and protection. Each said back layer 30 is a part of a one-piece sapphire film, and the second electrode 13 is disposed between and the high dielectric constant layer 11 and the back layer 30.

The lens unit 20 may include at least one silicon (Si) prism or silicon dioxide ($SiO_2$) lens. According to various applications, the lens unit 20 may include one single or plural lenses. In this embodiment, the lens unit 20 includes a triangular prism, the metal film is disposed at a side of the triangular prism, and the light-incident face 21 and the light-exiting face 22 are disposed at the other two sides of the triangular prism.

When the light beam 100 is incident in the solid-state optical phased scanning component, the power supply condition to the first and second electrodes 12, 13 of the plurality of optical units 10 can be adjusted by a control unit 40 so that the high dielectric constant layers 11 of the plurality of optical units 10 can have different refractive indexes, the light beam 100 from the light-incident face 21 into the lens unit 20 passes through the first electrode 12, comes into the high dielectric constant layer 11, is reflected from the second electrode 13, is refracted by the high dielectric constant layer 11, passes through the first electrode 12, and then emits out from the light-exiting face 22. At least part of light waves of the light beam 100 are refracted by at least part of the high dielectric constant layers 11 having different refractive indexes, which provides phase differences between the at least part of light waves of the light beam 100

By adjusting phase relationship between light waves of the light beam 100, constructive interference can be generated in a specific direction to achieve high-intensity directional light beam (destructive interference in other directions without light beam output). Therefore, the irradiation direction of one single or multiple high-intensity light beams can be controlled by the power supply condition to provide one-dimensional, two-dimensional and/or three-dimensional scanning in space. The light beam 100 is preferably transmitted in an optical fiber 50 and through a collimator 60, injected into the solid-state optical phased scanning component 1, and projected to the object to be scanned. The reflected light beam of the scanning light beam 100 can be received by, for example, an infrared camera or other light receiver, and then the scanning result may be obtained by a back-end processing device.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A solid-state optical phased scanning component, including:
   a plurality of optical units, each of the plurality of optical units including a high dielectric constant layer, and a first electrode and a second electrode located on two sides of the high dielectric constant layer, the refractive index of each said high dielectric constant layer being changeable as a power supply condition supplied to the first and second electrodes is changed; and
   a lens unit, being disposed to face toward a light-exiting side of the plurality of optical units, and including a light-incident face and a light-exiting face, being configured to guide light beam incident from the light incident surface to the plurality of optical units to change the path of the light beam, and then the light beam emitting out from the light exiting surface;
   wherein the high dielectric constant layers of the plurality of optical units are solid and rigid and are integrally formed of one piece;
   wherein each of the second electrodes of the plurality of optical units is independently separated from one another and located at a side of the high dielectric constant layer opposite the lens unit.

2. The solid-state optical phased scanning component of claim 1, wherein the plurality of optical units are arranged in a matrixed arrangement.

3. The solid-state optical phased scanning component of claim 1, wherein the high dielectric constant layer is a titanium carbide layer, silicon nitride layer, aluminum nitride layer, barium titanate layer, silicon dioxide ($SiO_2$) layer, or piezoelectric ceramic layer.

4. The solid-state optical phased scanning component of claim 1, wherein the first electrode is located between the lens unit and the high dielectric constant layer, and the first electrode is a silver (Ag) film, copper (Cu) film or gold (Au) film.

5. The solid-state optical phased scanning component of claim 4, wherein each said first electrode is a part of a metal film, and the metal film is integrally formed of one piece and formed as a single layer.

6. The solid-state optical phased scanning component of claim 1, wherein each of the plurality of optical units further includes a back layer which is located on a side of the high dielectric constant layer opposite the lens unit.

7. The solid-state optical phased scanning component of claim 6, wherein the back layer is a sapphire layer.

8. The solid-state optical phased scanning component of claim 1, wherein the lens unit further includes at least one silicon (Si) prism or silicon dioxide ($SiO_2$) lens.

9. The solid-state optical phased scanning component of claim 7, further including an optical fiber and a collimator connected with the optical fiber, the light beam is transmitted in the optical fiber and emits out from the collimator to the light-incident face; wherein the power supply condition is voltage; the plurality of optical units are arranged in a matrixed arrangement; the high dielectric constant layer is a titanium carbide layer, silicon nitride layer, barium titanate layer, or silicon dioxide ($SiO_2$) layer; each said high dielectric constant layer is a part of a one-piece high dielectric constant film; the first electrode is located between the lens unit and the high dielectric constant layer and is grounded, the first electrode is a light-permeable silver film, copper film, gold film or any suitable conductive film; each said first electrode a part of a metal film, and the metal film is integrally formed of one piece and formed as a single layer; the second electrode is located between the high dielectric constant layer and the back layer, and the second electrode is light-impermeable and includes a silver film, copper film, gold film or conductive film; each said back layer is a part of a sapphire film, and the sapphire film is integrally formed of one piece and formed as a single layer; the lens unit further includes at least one silicon (Si) prism which is a triangular prism or silicon dioxide ($SiO_2$) lens; and the metal film is disposed at a side of the triangular prism, and the light-incident face and the light-exiting face are disposed at the other two sides of the triangular prism, respectively.

* * * * *